(12) United States Patent
Prushko (10) Patent No.: US 11,648,973 B2
(45) Date of Patent: May 16, 2023

(54) BABY STROLLER HAVING A FRAME WITH ADJUSTABLE WIDTH

(71) Applicant: AVALEX INVESTMENT LIMITED, Nicosia (CY)

(72) Inventor: Ivan Vasyl'ovych Prushko, Lutsk (UA)

(73) Assignee: Avalex Investment Limited, Nicosia (CY)

( * ) Notice: Subject to any disclaimer, the term of this patent is extended or adjusted under 35 U.S.C. 154(b) by 81 days.

(21) Appl. No.: 17/467,370

(22) Filed: Sep. 6, 2021

(65) Prior Publication Data
US 2022/0234642 A1 Jul. 28, 2022

(30) Foreign Application Priority Data
Sep. 9, 2020 (UA) .............................. u 2020 05796

(51) Int. Cl.
*B62B 9/12* (2006.01)
*B62B 7/04* (2006.01)

(52) U.S. Cl.
CPC . *B62B 9/12* (2013.01); *B62B 7/04* (2013.01)

(58) Field of Classification Search
CPC .... B62B 9/12; B62B 7/04; B62B 7/06; B62B 7/08
See application file for complete search history.

(56) References Cited

U.S. PATENT DOCUMENTS

| | | | | |
|---|---|---|---|---|
| 4,984,768 A * | 1/1991 | Kolber | ................. | A47C 1/023 5/116 |
| 6,352,307 B1 * | 3/2002 | Engman | ................. | A61G 5/125 297/452.4 |
| 6,550,802 B2 * | 4/2003 | Sheehan | ................. | B62B 7/12 280/658 |
| 8,899,615 B2 * | 12/2014 | Dijkstra | ................. | B62B 7/14 280/42 |

FOREIGN PATENT DOCUMENTS

CN 105109536 A 12/2015

* cited by examiner

*Primary Examiner* — John D Walters
(74) *Attorney, Agent, or Firm* — Inventa Capital PLC (57) ABSTRACT

The invention relates to a field of a transport driven manually, namely, to baby strollers, and it is intended to allow an alternate use of different variants of a baby cradle or seat which differ in a size and in a weight on a frame thereof. A baby stroller having a frame with adjustable width, the frame consists of front wheel supports hingedly connected between each other, rear wheel supports which are equipped with wheel mounting assemblies, and handle supports, comprising a removable seat or cradle fixed on mounting places, wherein horizontal cross-bars are arranged between the supports of the rear wheels and front wheels. According to the invention, the frame consists of two semi-frames, and the horizontal cross-bars are made adjustable in length and arranged on each of the semi-frames so as to be fixable at least in a first frame adjustment position and at least in a second frame adjustment position.

13 Claims, 12 Drawing Sheets

BABY STROLLER HAVING A FRAME WITH ADJUSTABLE WIDTH

The invention relates to a field of a transport driven manually, namely, to baby strollers.

BACKGROUND OF PRIOR ART

It is known that the baby stroller comprises a frame that usually comprises a front wheel assembly and a rear wheel assembly which are arranged underneath a lower portion of the frame, a supporting device that is arranged on the frame to hold the baby's body, and a locking mechanism to fix the frame, if the stroller is foldable, when it is in an unfolded position.

According to a common trend, passing various steps of growth and development by a child is accompanied by changing several types of strollers, from a large stroller having a spacious cradle for a newborn baby to a compact stroller for travels or walks, when the cradle is no longer needed.

Thus, a definitive advantage is the baby stroller lies in a possibility of its structural changes in order to increase a number of usage options, e.g., to expand a usage period of the stroller in the course of adulting of the baby. The Applicant is aware of several technical solutions which are aimed to solve this problem with the following ones being the closest in terms of a set of essential features.

A baby stroller is known, wherein a base and a backrest have an adjustable width. Such structure of the stroller may be used to transport a single baby or two babies. Therewith, the width is adjusted by changing a mutual arrangement of tubular members on a lower portion of a support of rear wheels, while the backrest base consists of two portions, wherein one portion of the base passes into slots of the second portion of the base (pat. CN105109536 B dated Oct. 31, 2017).

A drawback of this stroller lies in the adjustment of the backrest width by changing the structure of the lower portion of the support of the rear wheels only which may lead to return of the base and the backrest into an initial position, if the only one fastening member arranged on the support is damaged. Furthermore, a surface of the base and the backrest is non-uniform and is characterized by a presence of a longitudinal strip created due to the fact that one portion of the base passes into slots of another portion which may cause a discomfort for the baby when the baby is located in the stroller.

Also, a three-wheel stroller for walks is known, wherein there is a possibility of making structural changes of the frame and of expanding the same from a single-seated model to a double-seated one. These changes of the frame structure are made due to mounting of an additional insert into a rear shaft and an additional insert into a handle that is coupled by a connecting buckle to the rear shaft and is coupled by a central plate to a front wheel assembly of the stroller. Therewith, all modifications are made without any additional auxiliary means (U.S. Pat. No. 6,550,802 B2 dated Apr. 22, 2003). A drawback of this stroller lies in that the width of the frame is changed without additional fastening members which, from one hand, simplifies the frame transformation, but, from another hand, may lead to folding of the stroller in case of abrupt movements, e.g., in case of its usage in conditions of rough roads. Furthermore, one of main drawbacks of three-wheel stroller lies in a complexity of its usage, when there are steps or curbs, since the structure loses its stability and balance when abutting upon the front wheel.

SUMMARY OF THE INVENTION

A four-wheel baby stroller is taken as the closest prior art, the stroller comprising a frame that consists of front wheel supports hingedly connected between each other, rear wheel supports which are equipped with wheel mounting assemblies, and a handle holder, comprising a removable seat or cradle fastened on mounting places, wherein horizontal cross-bars are arranged between the supports of the rear wheels and front wheels. The stroller structure implies adjustment of the frame width, thereby allowing to replace the baby seat, e.g., with a basket for products or toys, to mount at least one additional place in the form of the baby seat, basket for products etc., by expanding the frame and using special fastening members on a central support of the stroller which provide fastening of the additional place on the stroller frame. In addition to the expansion of the frame itself, this structure also allows to expand the baby seat and to fasten a dividing baffle thereon in order to arrange two babies on the seat simultaneously (U.S. Pat. No. 8,899,615B2 dated Dec. 2, 2014). A drawback of this stroller lies in a structural bulkiness due to the fact that at least one seat is mounted by means of the fastening members which are arranged on a central cross-frame support of the stroller and on side shafts of the base, while the change of the stroller width does not imply a transformation of the large heavy stroller into a portable light one and vice versa.

The invention is based on a task to allow an alternate use of different variants of the baby cradle or seat which differ in a size and in a weight on a single frame of the baby cradle by transforming the frame width and to provide fastening of the cradle or the seat by simplifying the structure of the stroller as compared to the prior art and by improving transforming and fastening members which minimize efforts during replacement of the cradle or the seat at the same time preserving stability and reliability of the structure of the stroller during use thereof.

The posed task is resolved by the fact that the baby stroller comprises a frame that consists of front wheel supports hingedly connected between each other, rear wheel supports which are equipped with wheel mounting assemblies, and a handle support, comprising a removable seat or cradle fastened on mounting places, wherein horizontal cross-bars are arranged between the supports of the rear wheels and front wheels. According to the invention, the frame consists of two semi-frames, and the horizontal cross-bars are made adjustable in length and arranged on each of the semi-frames so as to be fixable at least in a first frame adjustment position and at least in a second frame adjustment position, wherein in the first frame adjustment position, mounting locations are seating locations made in the semi-frames, the seating locations are openings and/or protrusions and/or adapters suitable for fixing means for fastening a replaceable framed seat or cradle, and in the second frame adjustment position, the mounting locations are the front wheel supports and handle supports as well, which a more portable and lighter sewed seat or cradle is fastened to.

A technical effect of such arrangement lies in to allow changing a type and a weight of the stroller, namely, from the large heavy one to the portable light one and vice versa, when using the same frame by changing its width and by replacing the cradle or the seat from the framed one to lighter sewed one, while using a minimum number of structural members and preserving the reliability of the structure.

Therewith, in one of separate embodiments of the claimed invention, the first frame adjustment position corresponds to a greater width of the frame, while the second frame adjustment position corresponds to a narrower width of the frame, and in another embodiment of the claimed invention, the first frame adjustment position corresponds to the narrower width of the frame, while the second frame adjustment position corresponds to the greater width of the frame.

Such arrangement may be used, if it is necessary to mount the framed or sewed cradle or seat both on the narrower and on the wider frame. For example, it may be reasonable to arrange the sewed seat or sewed cradle on the wider frame, thereby allowing to save the weight as compared to the framed seat or cradle, while having more space for the baby's comfort as compared to the narrower frame. In some embodiments, a number of the frame positions may not be limited to only two, and it may be adjusted in accordance with needs and desires of users and with consideration of available sizes of the cradles or seats.

Therewith, the stroller frame structure also allows to mount a car seat onto the frame, thereby optimizing the space when transporting the baby in a car, since in this case it will be sufficient to put the frame only, rather than the entire stroller, in a trunk.

Therewith, the horizontal cross-bars may be made as telescopically connected tubular members, wherein the telescopic connection may be made both detachable, thereby allowing to disassemble the frame completely so as to store and to transport the same in a portable fashion or to add, if necessary, an additional tubular section to the telescopic connection, and non-detachable, and foldable and adjustable in width only, thereby providing additional safety during use.

In separate embodiments of the claimed invention, the horizontal cross-bars may be made removable and/or replaceable and/or with a possibility of arranging additional members depending on the adjustable width of the frame.

The above-mentioned embodiments of the horizontal cross-bars may be used to allow implementation of the essence of the technical model, however, they do not limit the structural implementation examples which may be provided in a greater amount.

In a further embodiment of the claimed invention, the handle is made adjustable in width that corresponds to the adjustable width of the frame, while in another embodiment, the handle is made removable and/or replaceable depending on the adjustable width of the frame. Therewith, the wheel mounting assemblies of the front wheel support and/or the rear wheel support are made so as to allow replacement of the wheels with wheels having another size and weight, thereby allowing to adjust the stroller weight and to reduce it, if necessary.

An advantage of such structural solution lies in a possibility of use of the invention in various conditions, e.g., use of bigger wheels on rough roads or in winter and lighter wheels on smooth roads in parks or when transporting the stroller in the car etc.

A possibility of implementation of the invention that is characterized by the above-mentioned set of features, as well as a possibility of implementation of its purpose, may be confirmed by the description of the structure made in accordance with the present technical solution.

DESCRIPTION OF THE DRAWINGS

The implementation example of the baby stroller according to the invention is illustrated by drawings which depict the following.

DETAILED DESCRIPTION OF THE INVENTION

Figure 1:
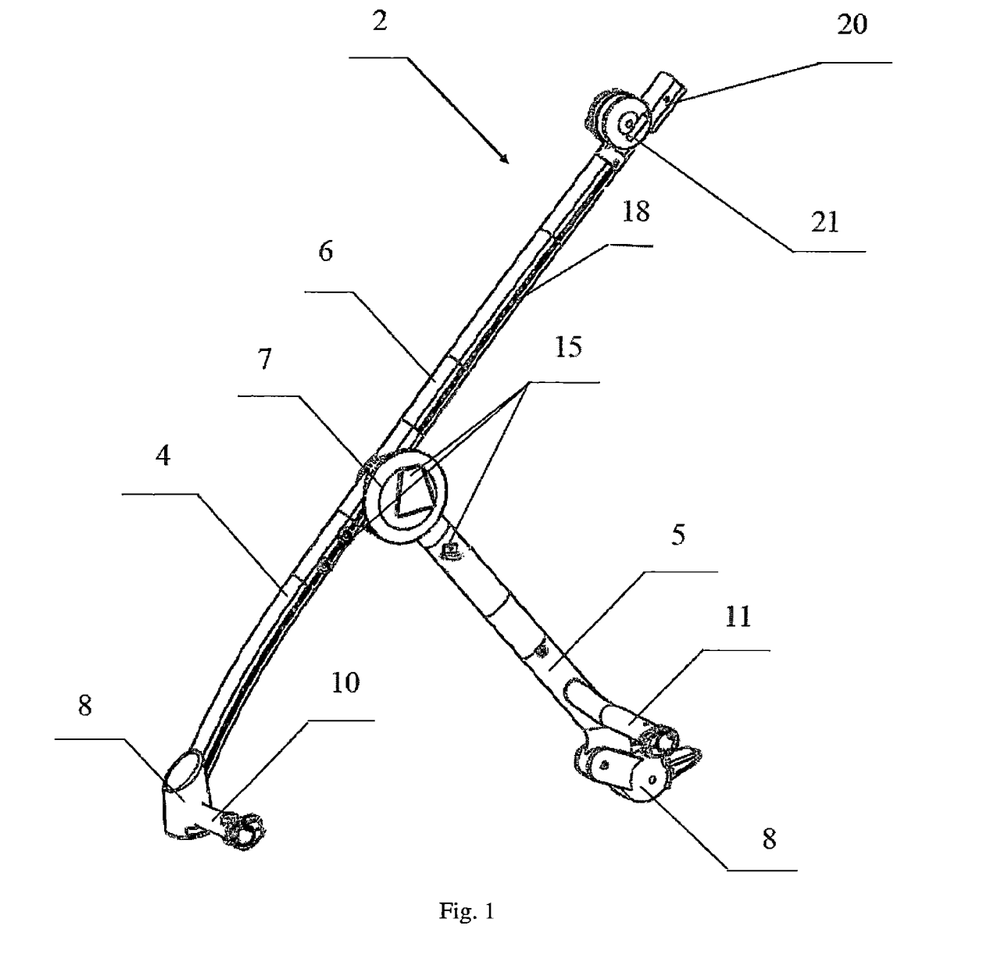
FIG. 1—the first semi-frame of the stroller.
Figure 2:
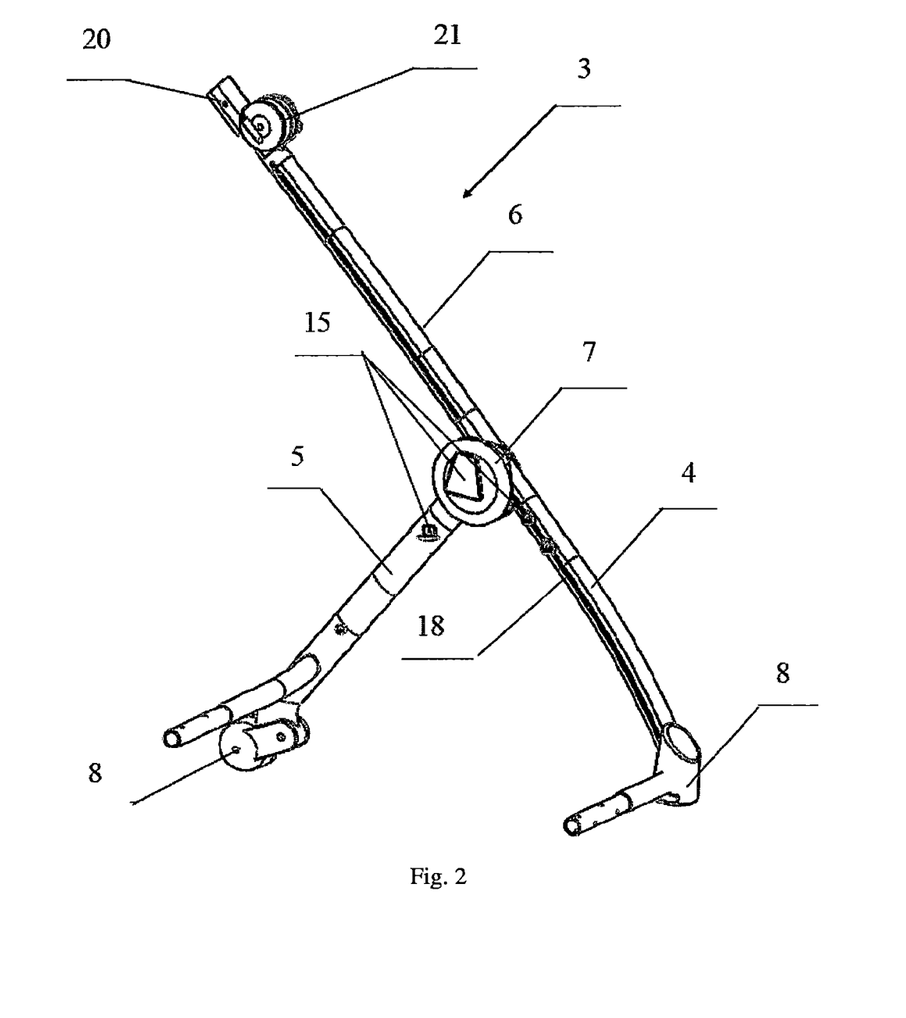
FIG. 2—the second semi-frame of the stroller.
Figure 3:
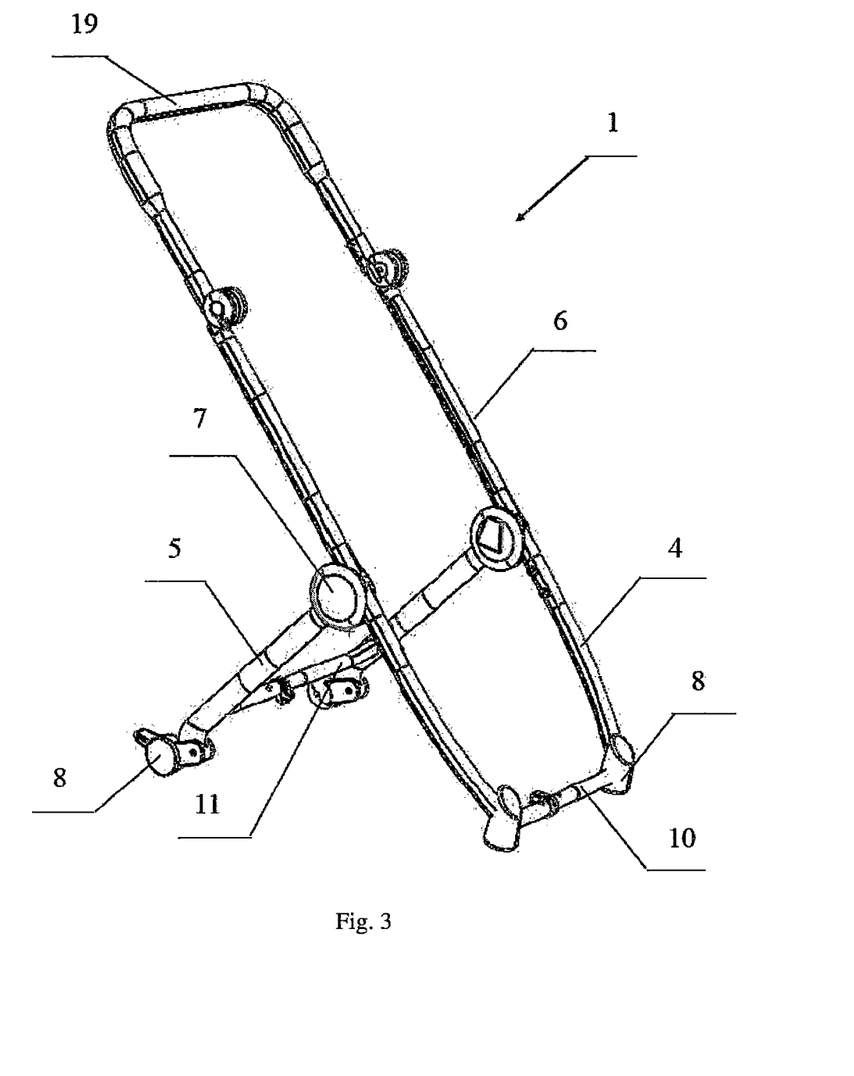
FIG. 3—a view of the stroller frame in the assembled condition in the position of the greater width.
Figure 4:
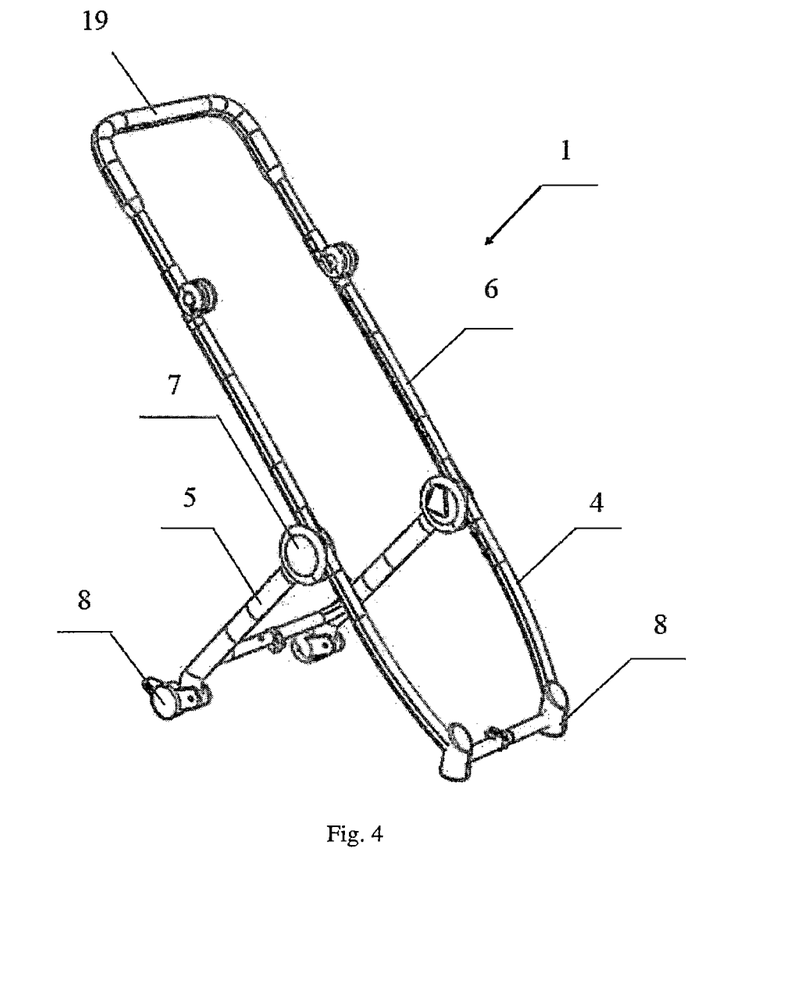
FIG. 4—a view of the stroller frame in the assembled condition in the position of the smaller width.
Figure 5:
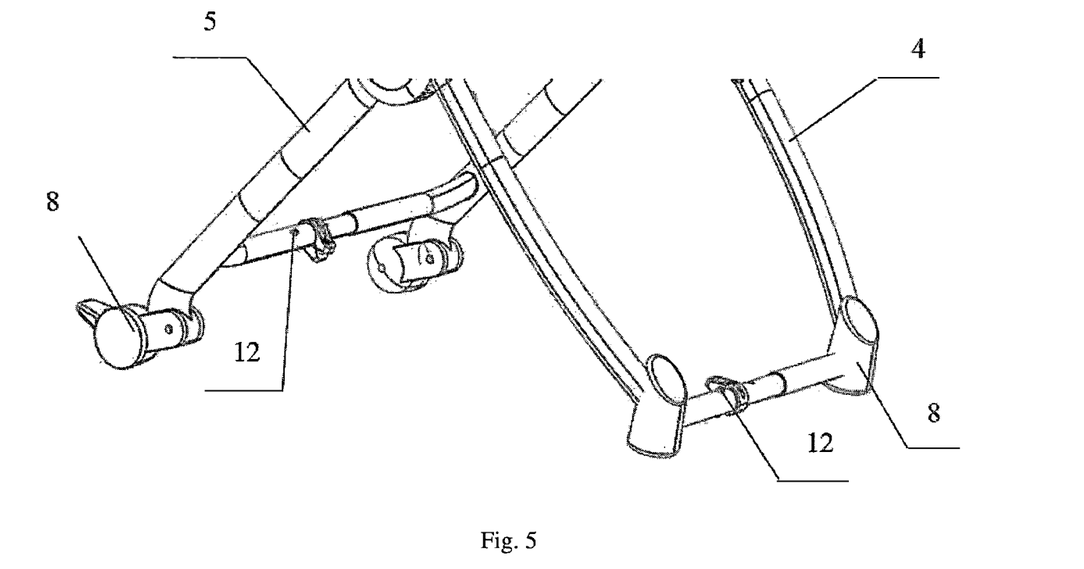
FIG. 5—a view of the wheel supports in the position of the greater width of the frame.
Figure 6:
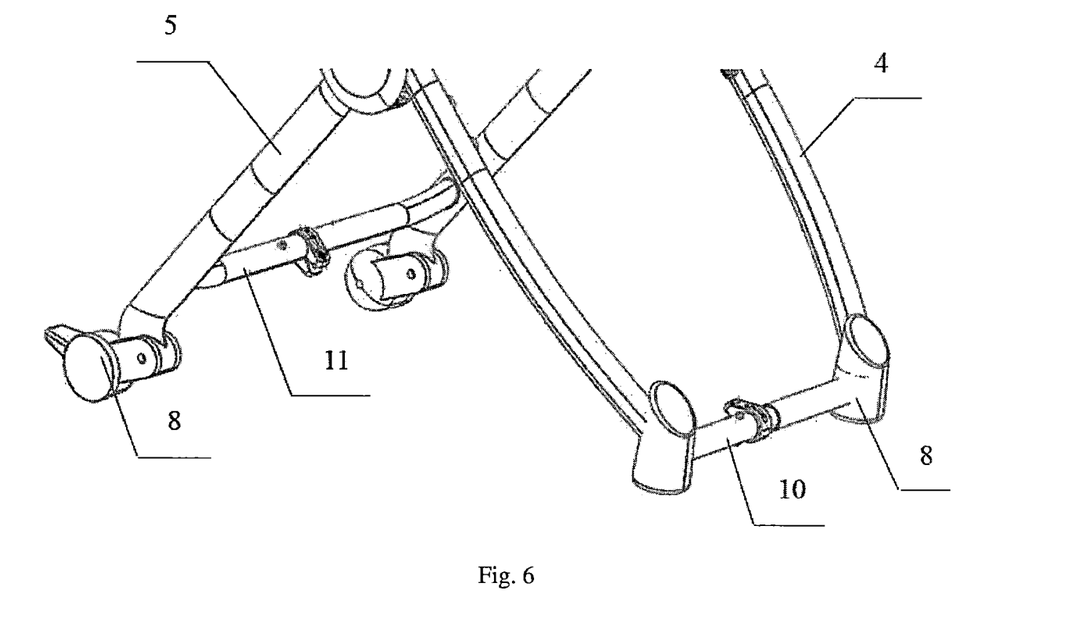
FIG. 6—a view of the wheel supports in the position of the smaller width of the frame.
Figure 7:
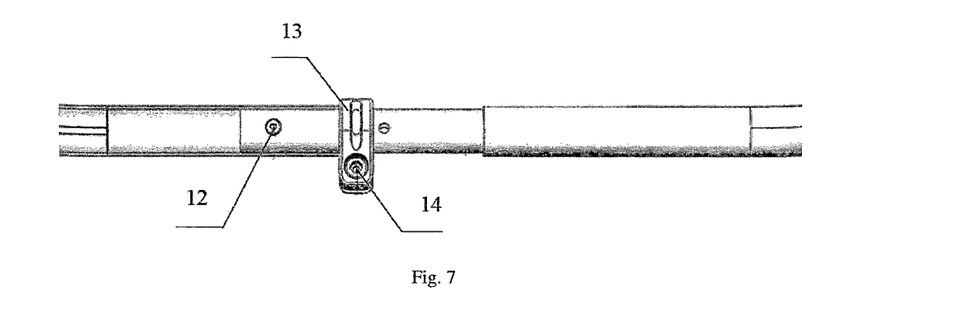
FIG. 7—a view of the telescopic connection and fastening of the tubular members in the position of the greater width of the frame.
Figure 8:
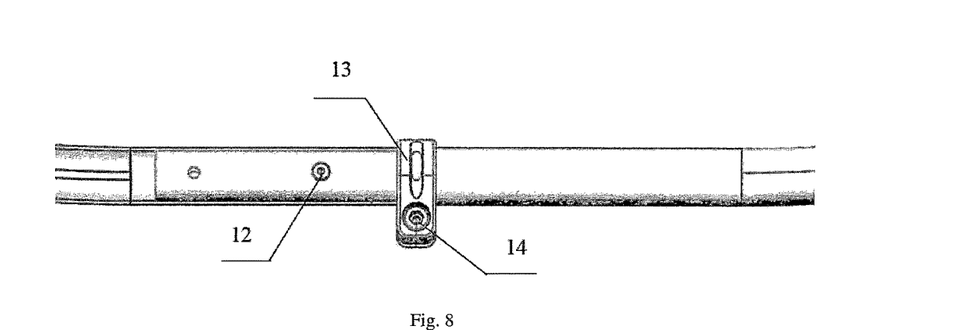
FIG. 8—a view of the telescopic connection and fastening of the tubular members in the position of the smaller width of the frame.
Figure 9:
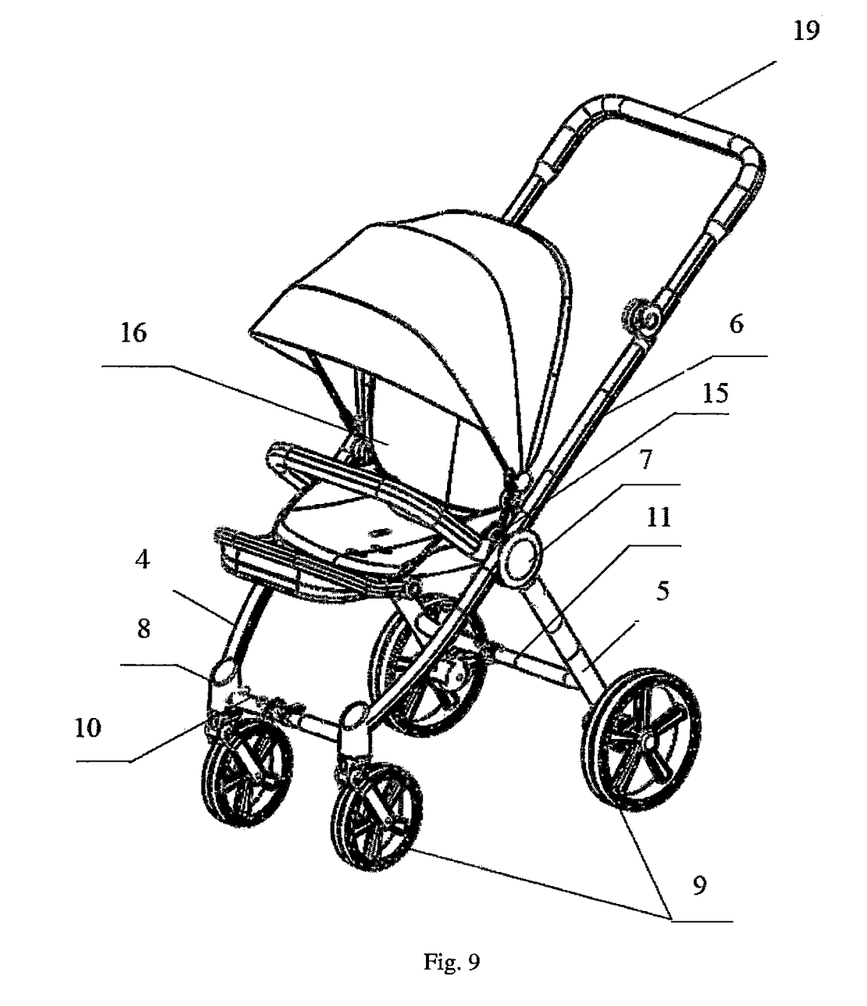
FIG. 9—a view of the stroller with the framed design of the seat that is connected to the frame by means of adapters on the wider frame with bigger wheels.

As seen in the drawings, the proposed baby stroller comprises a frame 1 that consists of semi-frames 2 and 3, while each of them consists of a front wheel support 4, a rear wheel support 5, a handle support 6 which are connected by a hinge 7, as illustrated in FIGS. 1 and 2. The supports 4 and 5 are provided with wheel mounting assemblies 8, and wheels 9 are fastened thereto with a possibility of replacing them in size, as illustrated in FIGS. 9-14. The semi-frames 2 and 3 are connected by horizontal cross-bars 10 and 11 being adjustable in length which, in the illustrated embodiment, are made telescopic and tubular, fastened on lower portions of the front wheel 4 and rear wheel supports 5, and equipped with fastening means in the at least first or in the at least second frame 1 adjustment position. Various variants of fastening means may be used as the means for fastening the cross-bars 10 and 11 in the required positions, e.g., a screw connection 12 in various positions of the telescopic decoupling of the cross-bars 10, 11 in a combination with a hose clamp 13 tightened by a screw 14, as illustrated in FIGS. 7 and 8, where reliability and rigidity of the connection are provided by means of the hose clamp 13 tightened by the screw 14, and the screw 12 serves as a guide and to provide an additional stability of the structure. Therewith, the frame 1 may be arranged at least in the first or at least in the second positions due to the telescopic connection and fixation of the cross-bars 10 and 11, as illustrated in FIGS. 9-14, and the telescopic connection may be made both as detachable one and non-detachable one.

Figure 10:
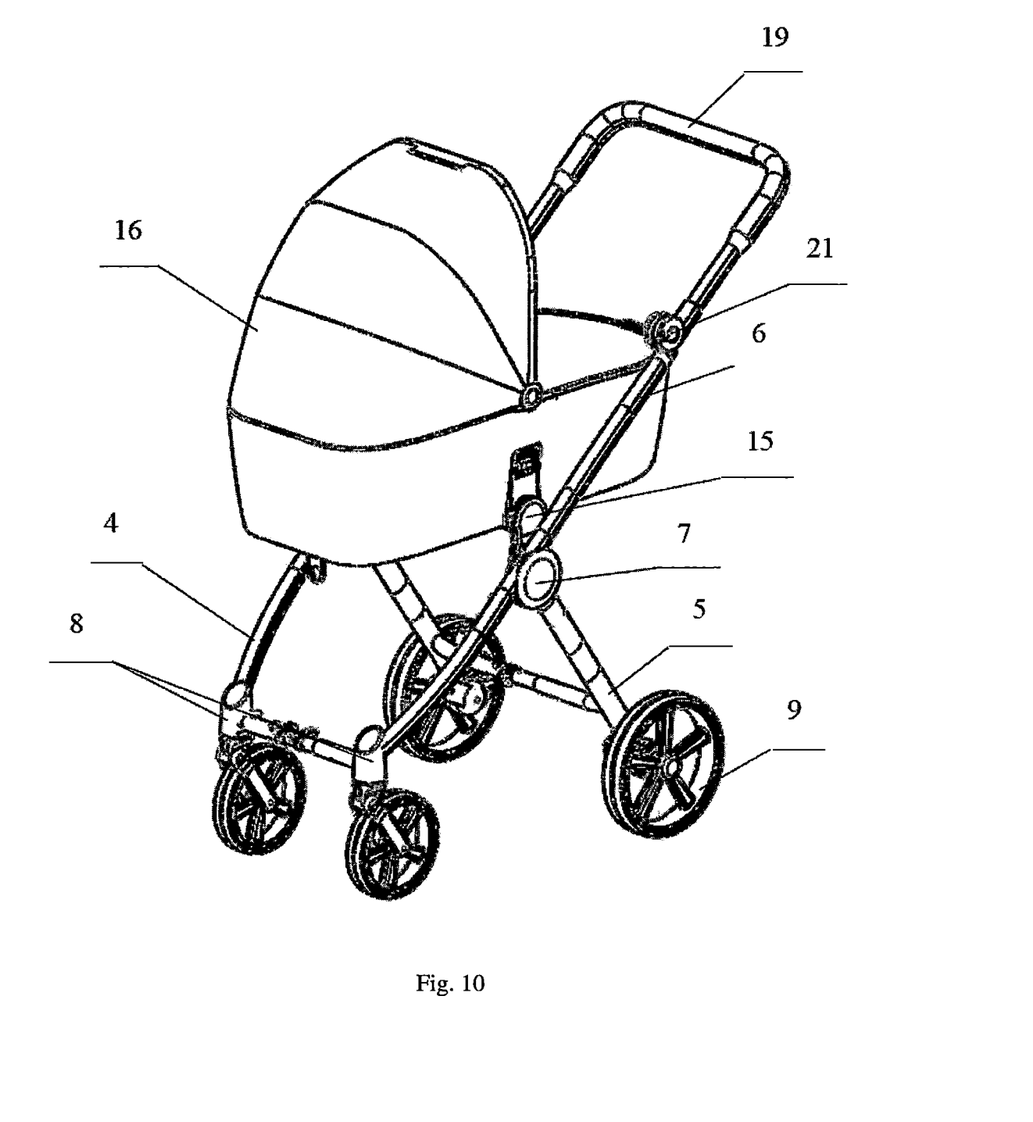
FIG. 10—a view of the stroller with the framed design of the cradle that is connected to the frame by means of adapters on the wider frame with bigger wheels.
Figure 11:
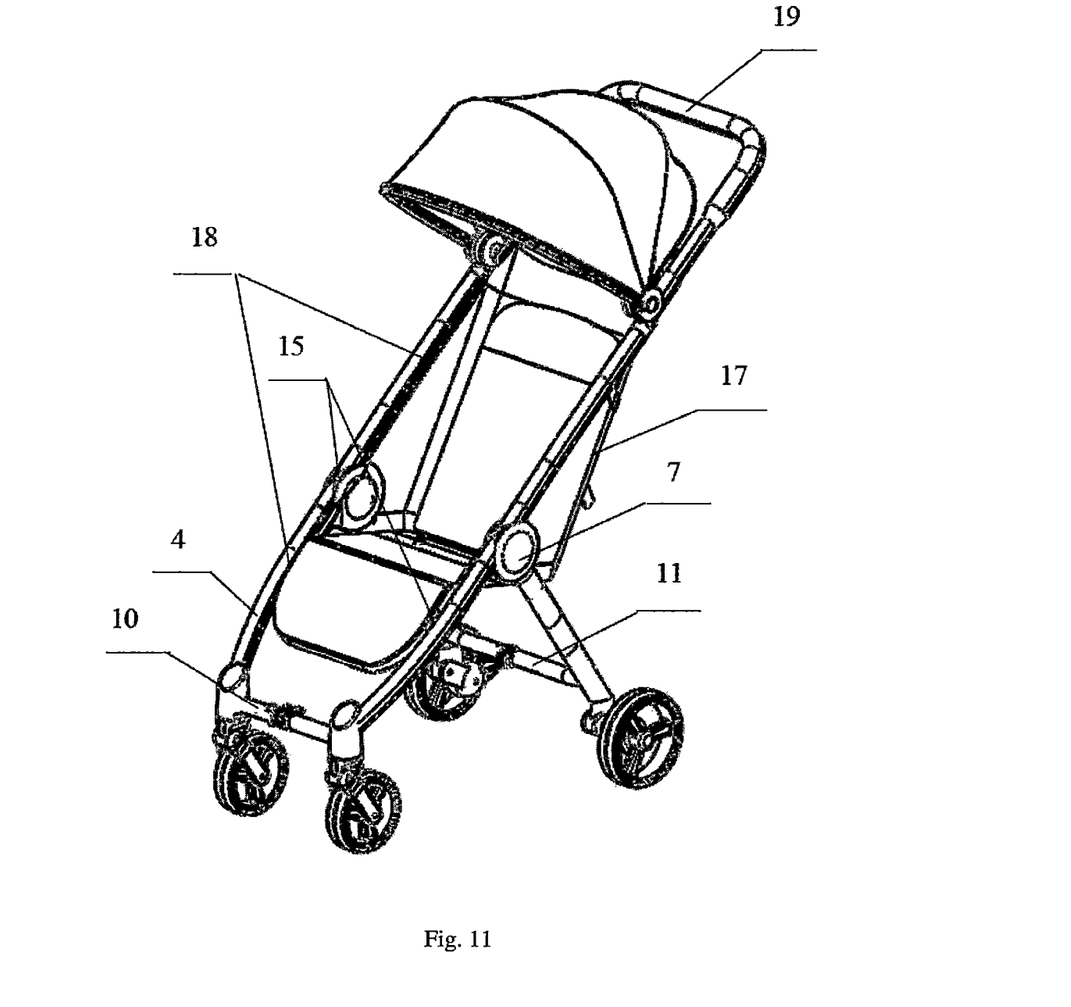
FIG. 11—a view of the stroller with the sewed seat that is connected to the front wheel supports and to the handle supports of the semi-frames on the narrower frame with smaller wheels.
Figure 12:
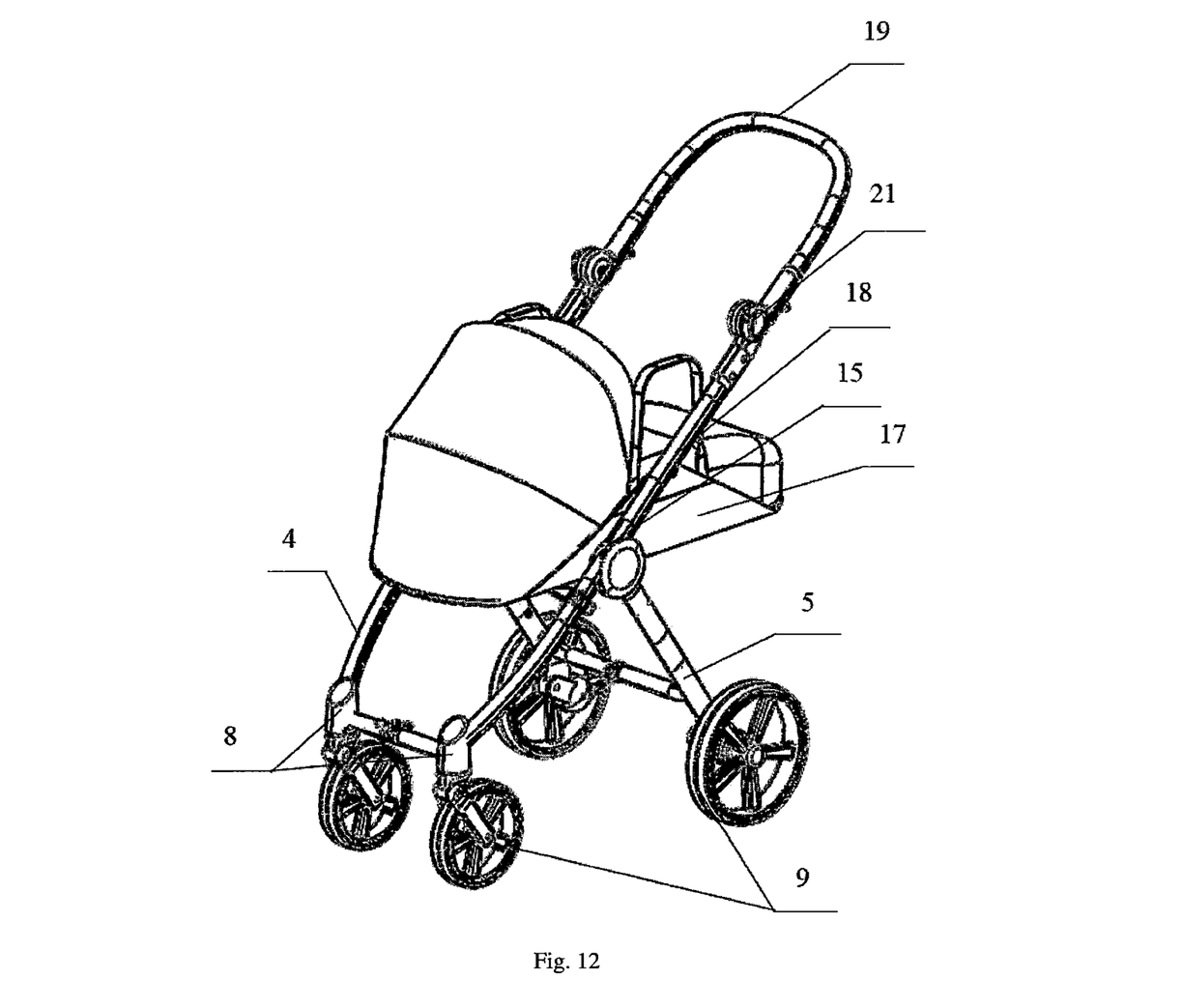
FIG. 12—a view of the stroller with the sewed cradle that is connected to the front wheel supports and to the handle supports of the semi-frames on the narrower frame with bigger wheels.
Figure 13:
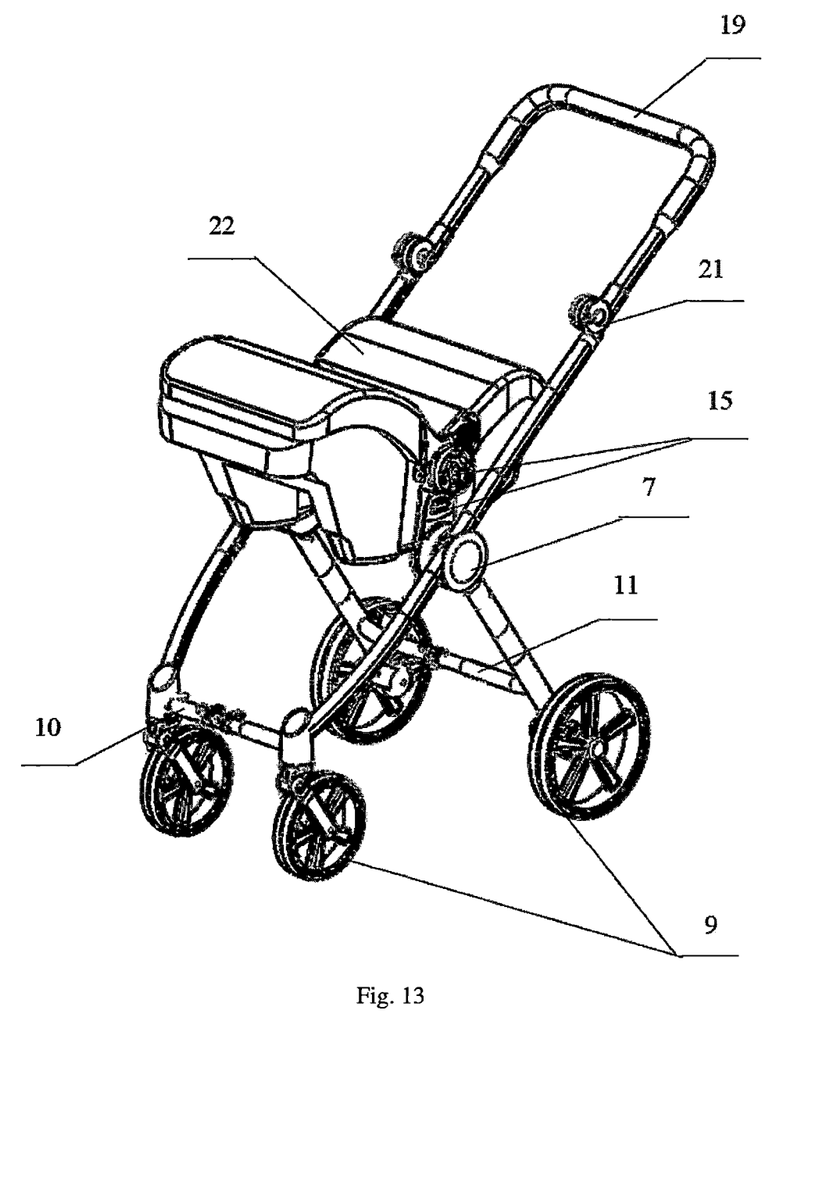
FIG. 13—a view of the stroller with the car seat on the wider frame with bigger wheels.
Figure 14:
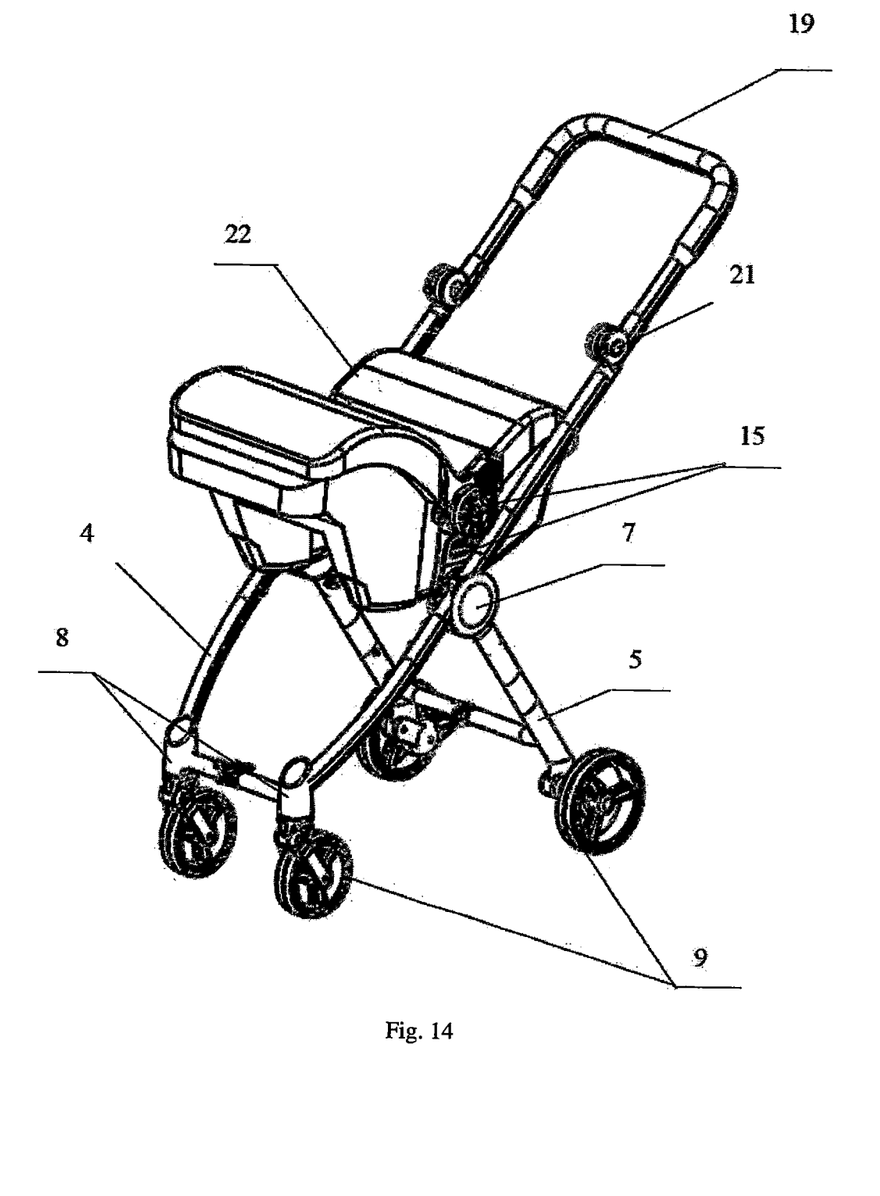
FIG. 14—a view of the stroller with the car seat on the narrower frame with smaller wheels.

The semi-frames 2 and 3 of the frame 1 are provided with mounting locations that may be in the form of adapters and/or openings and/or protrusions 15 which, in various embodiments, may be present on the frame 1 both altogether and individually or in various combination, thereby allowing to fasten the framed seat or cradle 16 by means of its own fastening means adapted to the frame depending on interaction with the mounting locations. In the embodiment illustrated in FIG. 9, the mounting location is the protrusion 15 on the hinge 7 that retains the framed seat or cradle, but in another embodiment, the protrusion 15 may be a recess or, as depicted in FIG. 10, the mounting location 15 is a transitional adapter between the cradle and the frame, thereby allowing to mount the cradle at a greater height. Slots 18 on the handle support 6 and on the front wheel support, the opening 15 on the rear wheel support 5 and the protrusions 15 on the front wheel support 4 together with said supports, all of them being depicted in the drawings, serve to fasten the sewed seat and cradle.

The sewed seat or cradle 17 may be mounted directly on the front wheel supports 4 and the handle supports 6, and fastened by means of the protrusions and/or recesses and/or openings 15 and/or further retained in the slots 18 provided on the front wheel supports 4 and the handle supports. In the upper portion of the frame 1 between the handle supports 6, a wider or narrower handle 19 may be mounted, or a handle may be mounted that is adjustable in width according to the cross-bars 10, 11 principles, the handle being fastened to the supports 6 by means of unscrewing/screwing screws 20 on a stroller folding mechanism 21 fastened on the handle supports 6. Also, the frame 1 may be used to mount and to transport the car seat 22 owing to the mounting locations which are the adapters 15 for various width of the frame which may be convenient when transporting the baby in the car. That is, protrusions, openings, recesses 15 etc. may serve as the mounting locations both for the framed 16 and for the sewed 17 design.

The essence of the difference between the framed structure and the sewed structure lies in the presence of the own frame of the seat or cradle that holds the sewing. In case of the sewed seat, the stroller frame 1 itself which is formed by two guides 2 and 3 serves as the frame, thereby allowing to achieve more compact sizes and lighter weight.

The width adjustment of the frame in the horizontal direction allows to transform the stroller with the wide spacious cradle or seat into the narrower, more compact and lighter variant. The cradle of the seat is fastened reliably due to the adaptability of the corresponding means for fastening to the frame, and it may be removed easily and quickly, as compared to the majority of modern strollers which utilize a rigid fastening, thereby making the replacement almost impossible. The implementation example of the transformation mechanism provides the stability of the frame structure, but it should be noted that the structural embodiments thereof may be different being totally mechanical and, e.g., the ones that utilize semi-automatic fastening means of a spring flaps type, while the cross-bars may be enclosed by a protective housing or a foot rest for the baby, it is also possible to add additional inserts to the telescopic cross-bars adjustable in length in order to increase their length, if necessary.

Instead of the telescopic tubular horizontal cross-bars, replaceable and/or replaceable, depending on the frame adjustable width, horizontal cross-bars may be used, the cross-bars also may be configured to add additional members. It is possible to use smaller or larger wheels which may have a significant impact onto the stroller weight and flotation. Also, it should be noted that the large stroller with the framed seat or cradle may be transformed into the small and narrower one with the sewed seat which will correspond to a hand luggage in terms of sizes and weight, particularly, for transportation in aircrafts.

Owing to said structural arrangement of the frame transformation, a large number of usage variants thereof is available during use depending on the user's needs. Therefore, the claimed invention is able to enable use of the stroller for a long time in various conditions.

The invention claimed is:

1. A baby stroller comprising
 a frame including front wheel supports and rear wheel supports hingedly connected between each other and equipped with wheel mounting assemblies, handle supports comprising a removable seat or cradle fastened on mounting places, and horizontal cross-bars each arranged between the rear wheel supports and front wheel supports, wherein the frame is formed of two semi-frames, and wherein the horizontal cross-bars are adjustable in length and arranged on each of the semi-frames so as to be fixable at least in a first frame adjustment position and a second frame adjustment position;
 wherein in the first frame adjustment position, mounting locations are seating locations made in the semi-frames, the seating locations are openings or protrusions or adapters suitable for fixing means for fastening a replaceable framed seat or cradle, and in the second frame adjustment position, the mounting locations are the front wheel supports and handle supports adapted to fixedly receive a sewed seat or cradle.

2. The baby stroller according to claim 1, wherein the first frame adjustment position corresponds to a greater width of the frame, and wherein the second frame adjustment position corresponds to a narrower width of the frame.

3. The baby stroller according to claim 1, wherein the first frame adjustment position corresponds to a narrower width of the frame, and wherein the second frame adjustment position corresponds to a greater width of the frame.

4. The baby stroller according to claim 1, wherein the horizontal cross-bars are made as telescopically connected tubular members.

5. The baby stroller according to claim 4, wherein a telescopic connection of the telescopically connected tubular members is non-detachable.

6. The baby stroller according to claim 4, wherein a telescopic connection of the telescopically connected tubular members is detachable.

7. The baby stroller according to claim 1, wherein the horizontal cross-bars are removable or replaceable depending on an adjustable width of the frame.

8. The baby stroller according to claim 1, wherein the horizontal cross-bars are configured to couple to additional members to change a width of the frame.

9. The baby stroller according to claim 1, wherein the frame has additional mounting locations for a sewed seat or cradle.

10. The baby stroller according to claim 1, wherein a handle is mounted between the handle supports, the handle is adjustable in in length corresponding to an adjustable width of the frame.

11. The baby stroller according to claim 1, wherein a handle is mounted between the handle supports, the handle is removable or replaceable depending on an adjustable width of the frame.

12. The baby stroller according to claim 1, wherein the wheel mounting assemblies of the front wheel supports or the rear wheel supports are replaceable with wheels having a different size and weight.

13. The baby stroller according to claim 1, wherein the frame is configured to mount a car seat.

* * * * *